United States Patent
Geshiro

(10) Patent No.: US 7,392,064 B2
(45) Date of Patent: Jun. 24, 2008

(54) PORTABLE TERMINAL EQUIPMENT AND COMMUNICATION METHOD THEREFOR

(75) Inventor: Mamoru Geshiro, Tokyo (JP)

(73) Assignee: NEC Corporation, Tokyo (JP)

( * ) Notice: Subject to any disclaimer, the term of this patent is extended or adjusted under 35 U.S.C. 154(b) by 805 days.

(21) Appl. No.: 10/404,834

(22) Filed: Apr. 2, 2003

(65) Prior Publication Data

US 2004/0203669 A1 Oct. 14, 2004

(30) Foreign Application Priority Data

Apr. 25, 2002 (JP) ............................. 2002-123343

(51) Int. Cl.
*H04B 1/38* (2006.01)
*H04M 1/00* (2006.01)

(52) U.S. Cl. ..................... 455/564; 455/566; 455/575.3; 455/569.1

(58) Field of Classification Search ................ 455/566, 455/575.3, 564, 569.1; 379/422–427, 352, 379/355–359
See application file for complete search history.

(56) References Cited

U.S. PATENT DOCUMENTS

| | | | |
|---|---|---|---|
| 5,493,604 A * | 2/1996 | Hirayama | 455/564 |
| 5,960,357 A | 9/1999 | Kim | |
| 6,009,338 A * | 12/1999 | Iwata et al. | 455/575.4 |
| 6,095,565 A * | 8/2000 | Kramer | 281/42 |
| 6,141,540 A * | 10/2000 | Richards et al. | 455/575.3 |
| 6,226,501 B1 * | 5/2001 | Weadon et al. | 455/575.3 |
| 6,269,256 B1 * | 7/2001 | Nakamura | 455/567 |
| 6,622,174 B1 * | 9/2003 | Ukita et al. | 709/246 |
| 6,628,508 B2 * | 9/2003 | Lieu et al. | 361/680 |
| 6,728,558 B1 * | 4/2004 | Kubo et al. | 455/575.4 |
| 6,785,562 B2 * | 8/2004 | Lee et al. | 455/566 |
| 6,944,481 B2 * | 9/2005 | Hama et al. | 455/566 |
| 6,980,835 B2 * | 12/2005 | Hama | 455/567 |

(Continued)

FOREIGN PATENT DOCUMENTS

EP 0 534 478 A3 9/1992

(Continued)

OTHER PUBLICATIONS

United Kingdom Search Report dated Oct. 15, 2003.

(Continued)

*Primary Examiner*—Fan Tsang
*Assistant Examiner*—Lisa Hashem
(74) *Attorney, Agent, or Firm*—McGinn IP Law Group, PLLC

(57) ABSTRACT

This invention provides a folding type or flip type portable terminal equipment including a storage unit for storing one or a plurality of telephone numbers, a telephone number selection section for selecting a predetermined telephone number from the telephone numbers stored in the storage unit while the portable terminal equipment is closed, a telephone number display unit for displaying the telephone number selected by the telephone number selection section while the portable terminal equipment is closed, an opening/closing detection circuit for detecting opening/closing of the portable terminal equipment, and a control section for automatically originating a call to the telephone number selected by the telephone number selection section when an open state of the portable terminal equipment is detected by the opening/closing detection circuit, and a communication method for the portable terminal equipment.

17 Claims, 3 Drawing Sheets

U.S. PATENT DOCUMENTS

| | | |
|---|---|---|
| 7,003,268 B2 * | 2/2006 | Nishiyama et al. .......... 455/90.3 |
| 7,039,443 B2 * | 5/2006 | Opela et al. .................. 455/565 |
| 7,069,056 B2 * | 6/2006 | Iwata et al. .................. 455/566 |
| 7,103,396 B2 * | 9/2006 | Kubo et al. ............... 455/575.4 |
| 7,221,914 B2 * | 5/2007 | Ho et al. ..................... 455/90.3 |
| 2002/0019216 A1 * | 2/2002 | Horiguchi .................... 455/90 |
| 2002/0058527 A1 * | 5/2002 | Kawasaki et al. ............ 455/550 |
| 2005/0221865 A1 * | 10/2005 | Nishiyama et al. .......... 455/566 |
| 2005/0227635 A1 * | 10/2005 | Hawkins et al. ............ 455/90.3 |
| 2006/0003809 A1 * | 1/2006 | Boling et al. ................ 455/564 |
| 2006/0098238 A1 * | 5/2006 | Ylonen ........................ 358/402 |
| 2006/0135212 A1 * | 6/2006 | Griefith et al. ............... 455/564 |
| 2006/0171524 A1 * | 8/2006 | Tsuchiya et al. ....... 379/355.01 |

FOREIGN PATENT DOCUMENTS

| | | |
|---|---|---|
| JP | 09-307610 | 11/1997 |
| JP | 2000-083089 | 3/2000 |
| JP | 2000-244625 | 9/2000 |
| JP | 2001-127842 | 5/2001 |
| JP | 2001-168973 | 6/2001 |
| JP | 2001-186227 | 7/2001 |
| JP | 2002-009927 | 1/2002 |
| WO | WO 02/065263 A1 | 8/2002 |

OTHER PUBLICATIONS

Japanese Office Action dated Jul. 25, 2006 (with partial English translation).

* cited by examiner

PORTABLE TERMINAL EQUIPMENT AND COMMUNICATION METHOD THEREFOR

BACKGROUND OF THE INVENTION

1. Field of the Invention

The present invention relates to a portable terminal equipment and a communication method therefor and, more particularly, to a folding type or flip type portable terminal equipment and a communication method therefor.

2. Description of the Prior Art

Recently, as an increasing number of people have used portable terminal equipments such as portable cellular phone sets, some attempts have been made to make it easy for, for example, aged people to carry portable cellular phone sets. As one of these attempts, a technique is disclosed in Japanese Unexamined Patent Publication No. 2000-9927, in which the opening/closing operation of a folding type portable cellular phone set, which is its characteristic feature, is used to detect an open state of the main body of a folding type portable cellular phone set so as to automatically originate a call to the telephone number of a specific person.

This disclosed technique is associated with a folding type portable cellular phone set, which uses a multicolor light-emitting diode for allowing visual recognition from outside even while the main body is closed. This diode emits different colors of light in accordance with destination telephone numbers. When the main body opens, a call is automatically originated to a telephone number corresponding to a preselected color. On setting for an automatic call originating mode is performed by turning on the multicolor light-emitting diode using a side key (which can be operated in the folded state of the main body).

In the technique disclosed in the above reference, however, if the operator has not grasped the relationship between the colors of light emitted from the diode and the telephone numbers, the operator must check, before opening the main body, whether the colors of light emitted from the diode have been set to colors corresponding to desired destination telephone numbers.

In setting automatic call origination, the following cumbersome automatic call origination/registration is required (see paragraph "0043" of the above reference): setting the main body in an open state, operating a key operation section 13 to register, in a memory 22, a destination telephone number to which a call is to be automatically originated, operating a side key 17 to make a multicolor light-emitting diode 16 emit light, assigning an arbitrary color of the multicolor light-emitting diode 16 to the destination telephone number, and registering it in the memory 22.

These checks and operation are a great burden for operators unfamiliar with key operation, e.g., aged people, in particular.

SUMMARY OF THE INVENTION

The present invention has been made in consideration of the above situation in the prior art, and has as its object to provide a portable terminal equipment which makes it easy to check a telephone number to which a call is to be automatically originated and to set automatic call origination, and a communication method for the portable terminal equipment.

In order to achieve the above object, according to the first aspect of the present invention, there is provided a portable terminal equipment comprising storage means for storing one or a plurality of telephone numbers, telephone number selection means for selecting a predetermined telephone number from the telephone numbers stored in the storage means while the portable terminal equipment is closed, telephone number display means for displaying the telephone number selected by the telephone number selection means while the portable terminal equipment is closed, opening/closing detection means for detecting opening/closing of the portable terminal equipment, and control means for automatically originating a call to the telephone number selected by the telephone number selection means when an open state of the portable terminal equipment is detected by the opening/closing detection means.

The telephone number selection means of the portable terminal equipment according to the first aspect comprises an automatic call originating mode on/off setting switch and a telephone number selection switch.

The automatic call originating mode on/off setting switch further comprises a function of selecting whether or not to make the control means automatically originate a call while the portable terminal equipment is closed.

The portable terminal equipment according to the first aspect is a folding type or flip type portable terminal equipment.

In order to achieve the above object, according to the second aspect of the present invention, there is provided a communication method for a portable terminal equipment including storage means for storing one or a plurality of telephone numbers, telephone number selection means for selecting a predetermined telephone number from the telephone numbers stored in the storage means while the portable terminal equipment is closed, telephone number display means for displaying the telephone number selected by the telephone number selection means while the portable terminal equipment is closed, opening/closing detection means for detecting opening/closing of the portable terminal equipment, and control means for automatically originating a call to the telephone number selected by the telephone number selection means when an open state of the portable terminal equipment is detected by the opening/closing detection means, comprising the open/closed state detection step of detecting an open/closed state of the portable terminal equipment, the communicative state establishment step of establishing a communicative state when the open state is detected, the voice communication step of performing voice communication with a person having a selected telephone number, the closed state detection step of detecting the closed state of the portable terminal equipment after the voice communication, and the communication termination control step of controlling communication termination when the closed state is detected.

As is obvious from the respective aspects, the portable terminal equipment according to the present invention is a folding type or flip type portable terminal equipment which makes it easy to check a telephone number to which a call is to be automatically originated and to set automatic call origination.

This can therefore reduce the burden on operators unfamiliar with key operation, e.g., aged people, which is imposed when they check a telephone number to which a call is to be automatically originated and set automatic all origination. In addition, since a call can be automatically originated without pressing any keys to input a telephone number, a conversation in a secret room or in a dangerous place can be signaled to a third party without having the other party engaged in the conversation find about it. Furthermore, the communication method of the present invention has the same effects as those of the above portable terminal equipment.

The above and many other objects, features and advantages of the present invention will become manifest to the skilled in the art upon making reference to the following detailed description and accompanying drawings in which a preferred embodiment incorporating the principle of the present invention is shown by way of the illustrative examples.

DETAILED DESCRIPTION OF THE PREFERRED EMBODIMENTS

A few preferred embodiments of the present invention will be described below with reference to the accompanying drawings.

Portable cellular phone sets include, for example, phone sets in shapes generally called the straight type, flip type, and folding type. The straight type has a speaker, a microphone, various keys, and the like arranged on the front surface. The flip type has a speaker, a microphone, various keys, and the like arranged on the front surface, like the straight type, and also has an opening/closing cover that covers the key operation section. This cover is opened at the time of call origination or termination. The folding type is carried in the folded state. At the time of call origination or termination, the folding type is used in the same state as that of the straight type.

The first embodiment of the present invention will be described first. The first embodiment relates to a folding portable cellular phone set.

Figure 1:
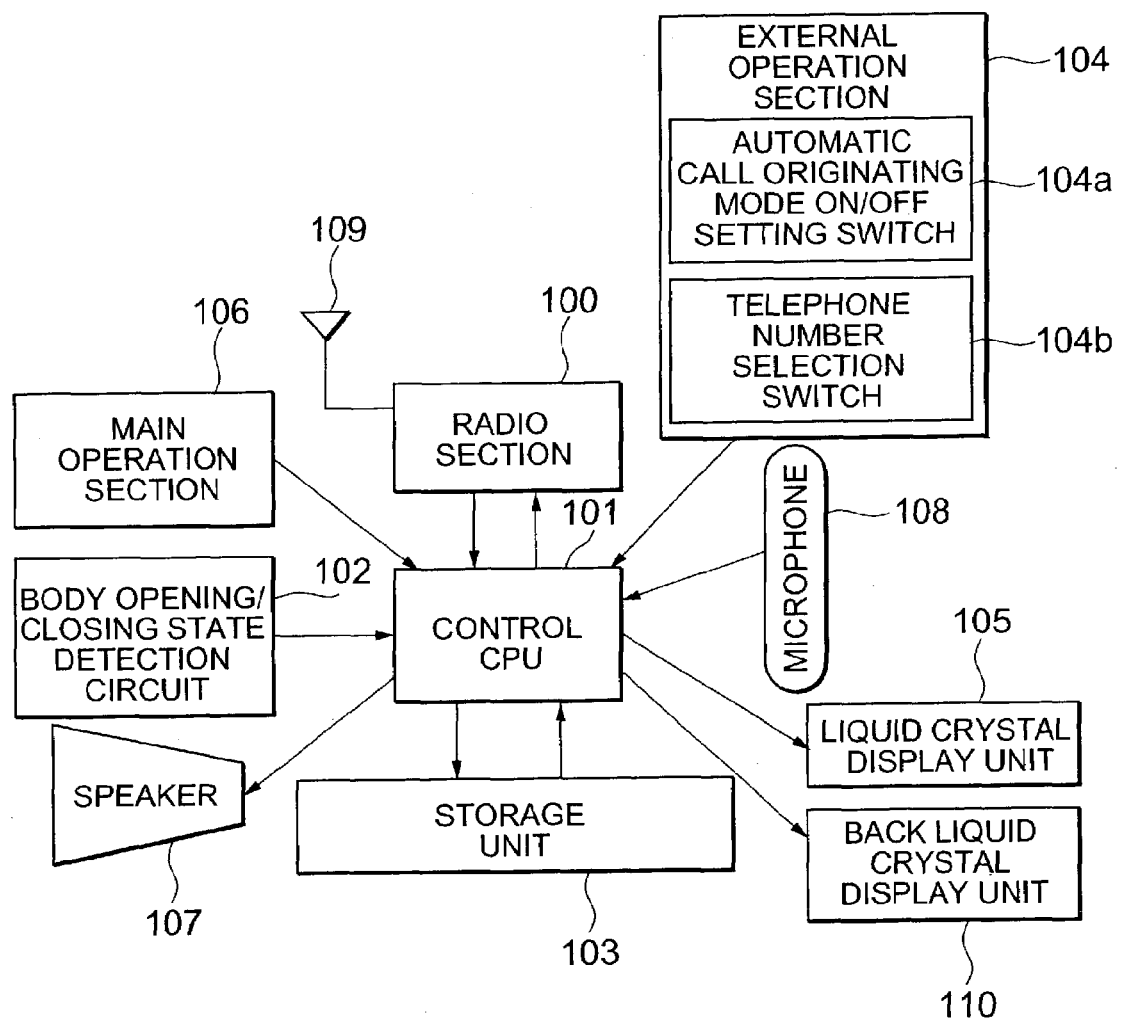
FIG. 1 is a block diagram showing a portable cellular phone set according to the first embodiment of the present invention.

As shown in FIG. 1, the portable cellular phone set according to the present invention has a radio section 100, control CPU (Central Processing Unit) 101, body opening/closing state detection circuit 102, storage unit 103, external operation section 104, liquid crystal display unit 105, main operation section 106, speaker 107, microphone 108, antenna 109, and back liquid crystal display unit 110.

The radio section 100 establishes a communicative state between the portable cellular phone set and a base station (not shown) through the antenna 109. The control CPU 101 receives a signal from the body opening/closing state detection circuit 102 and controls the radio section 100 to perform call origination. The body opening/closing state detection circuit 102 detects whether the portable cellular phone set is in an open or closed state. One or a plurality of destination telephone numbers are stored in the storage unit 103.

The external operation section 104 is an operation section to be used in place of the main operation section 106 when the portable cellular phone set is closed and the main operation section 106 cannot be used. The external operation section 104 is mounted on a portion of the portable cellular phone set where the operator can operate the section 104 from outside when the phone set is closed. For example, the external operation section 104 is mounted on a side surface, the front surface, or the rear surface of the portable cellular phone set, i.e., a portion where the operator can visually recognize the external operation section 104 from outside while the portable cellular phone set is closed. The external operation section 104 can be formed from a switch in an arbitrary form, e.g., a key, button, slide switch, or rotational dial.

The liquid crystal display unit 105 is a main display unit, which is formed to be visually recognized from outside when the portable cellular phone set is opened, and to be hidden inside the portable cellular phone set so as not to be visually recognized when the portable cellular phone set is closed.

The main operation section 106 is a key operation section including numeral keys. Like the liquid crystal display unit 105, the main operation section 106 is formed to be operated from outside when the portable cellular phone set is opened, and to be hidden inside the portable cellular phone set so as not to be operated when the portable cellular phone set is closed.

The first housing containing the liquid crystal display unit 105 and the second housing containing the main operation section 106 are foldably coupled to each other. When the portable cellular phone set is closed, the liquid crystal display unit 105 faces the main operation section 106.

The speaker 107 is a receiver mounted on, for example, an upper portion of the same surface as the liquid crystal display unit 105. The microphone 108 is a transmitter mounted on, for example, a lower portion of the same surface as the main operation section 106. The positions of the speaker 107 and microphone 108 are not limited to these and can be amounted at any portions as long as no trouble occurs in voice communication. The antenna 109 is an antenna for radio wave transmission/reception.

The back liquid crystal display unit 110 is a display unit to be used in place of the liquid crystal display unit 105 when the portable cellular phone set is closed and the liquid crystal display unit 105 is hidden inside the portable cellular phone set. The back liquid crystal display unit 110 is mounted on a portion where it can be directly seen from outside when the portable cellular phone set is closed. For example, this display unit is mounted on the rear surface of the first housing (the opposite surface to the surface on which the liquid crystal display unit 105 is mounted). However, the position of the back liquid crystal display unit 110 is not limited to this and it can be mounted on an arbitrary portion as long as it can be directly seen from outside when the portable cellular phone set is closed. In the first embodiment, for example, the back liquid crystal display unit 110 is formed from a liquid crystal, but can be formed from a light-emitting device such as a light-emitting diode.

The control CPU 101 stores, in the storage unit 103, one or a plurality of destination telephone numbers which are input by the main operation section 106 including numerical keys. The user can originate a call by directly inputting a telephone number through the main operation section 106. The user can also originate a call by reading out a predetermined telephone number from the storage unit 103. In addition, according to the present invention, telephone numbers stored in the storage unit 103 are also used for automatic call origination (to be described later). This can save the operation of registering telephone numbers for automatic call origination in advance as in the technique disclosed in the above reference.

The external operation section 104 will be described next. As described above, the external operation section 104 can be operated while the portable cellular phone set is closed. In other words, while the portable cellular phone set is closed, ON/OFF setting for the mode of automatically originating a call when the portable cellular phone set is opened can be made by operating the external operation section 104. With this operation, when the portable cellular phone set is opened, a call is automatically generated (obviously, ON/OFF setting for the automatic call origination mode can be made while the portable cellular phone set is open, but a description thereof will be omitted below).

When ON setting for the automatic call origination mode is made by operating the external operation section 104 while the portable cellular phone set is closed, a call is automatically originated when the portable cellular phone set is opened. When the portable cellular phone set is closed afterward, the communication is finished.

When OFF setting for the automatic call origination mode is made by operating the external operation section 104 while the portable cellular phone set is closed, no call is automatically originated when the portable cellular phone set is opened. Note that a call is automatically originated to only one telephone number selected from the telephone numbers stored in the storage unit 103.

As described above, in the present invention, a call can be automatically originated by only making ON setting for the automatic call origination mode by operating the external operation section 104 and opening the portable cellular phone set. There is therefore no need to register a telephone number for automatic call origination as in the technique disclosed in the above reference.

A telephone number to which a call is to be automatically originated is also selected by operating the external operation section 104. The external operation section 104 has an automatic call originating mode on/off setting switch 104a and telephone number selection switch 104b. Note that the automatic call originating mode on/off setting switch 104a may further have a function of selecting whether to make the control CPU automatically originate a call while the portable cellular phone set is closed. This allows the user to perform voice communication by using an earphone while the portable cellular phone set is placed, for example, in a bag.

The telephone number selected (i.e., read out from the storage unit 103 by the external operation section 104) by the operator is displayed on the back liquid crystal display unit 110. This telephone number can therefore be checked on the back liquid crystal display unit 110 even while the portable cellular phone set is closed. The telephone number displayed on the back liquid crystal display unit 110 can be recognized by ordinary people. Therefore, the operator need not check the relationship between the color of light emitted from the diode and the destination telephone number as in the technique disclosed in the above reference.

Although this telephone number can be displayed all the time, the number can also be displayed only in the closed state of the portable cellular phone set. In addition, the telephone number can be displayed only when the portable cellular phone set is closed and ON setting for the automatic call origination mode is made.

Figure 2:
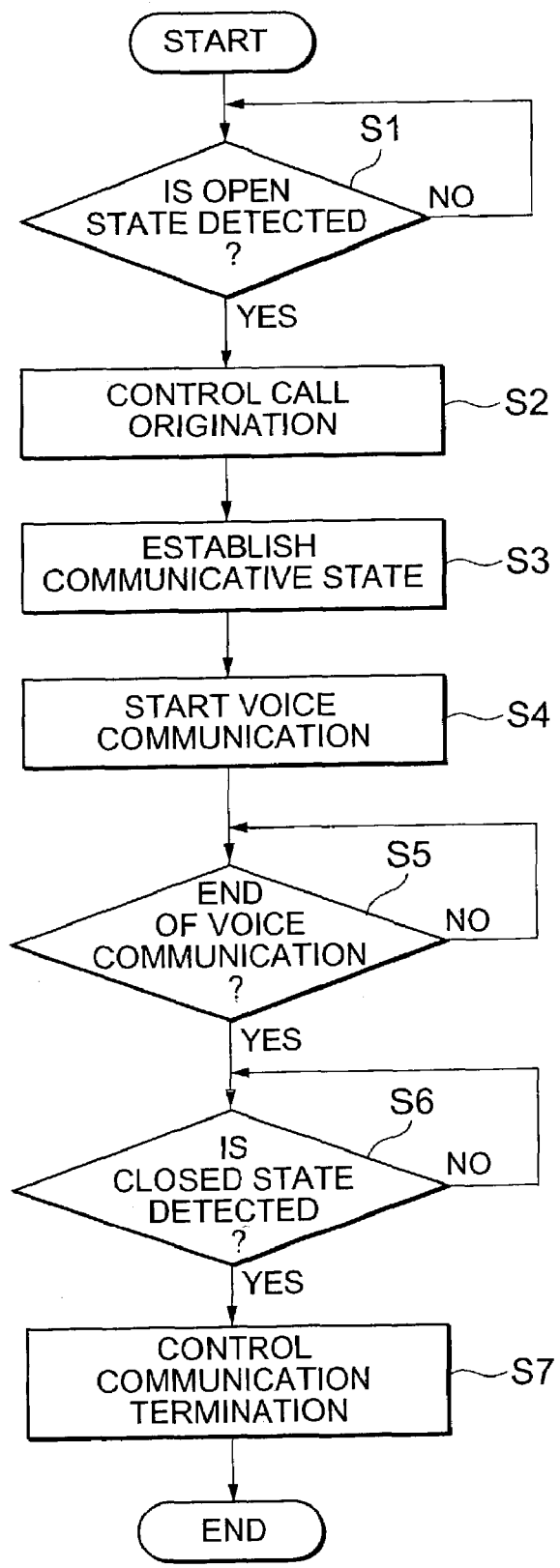
FIG. 2 is a flow chart showing the operation of the first and second embodiments.

The operation of the first embodiment will be described next with reference to the flow chart of FIG. 2.

Before the description of the operation, assume that (1) at least one destination telephone number is stored in the storage unit 103, (2) the external operation section 104 has been operated to make ON setting for the mode of automatically originating a call when the closed portable cellular phone set is opened, and (3) a destination telephone number to which a call is to be automatically originated has been selected by operating the external operation section 104.

First of all, when the state of the folding portable cellular phone set is changed from the closed state to the open state, the body opening/closing state detection circuit 102 detects the "open state" of the portable cellular phone set and sends out a signal indicating the open state to the control CPU 101 (YES in step S1). Upon reception of the signal indicating the open state from the body opening/closing state detection circuit 102, the control CPU 101 controls the radio section 100 to originate a call to the selected destination telephone number as an automatic call origination target (S2).

The radio section 100 then establishes a communicative state between the portable cellular phone set and a base station (not shown) through the antenna 109. This allows the operator to perform voice communication by using the speaker 107 and microphone 108 (S3).

The operator then starts voice communication with a person having the selected telephone number (S4).

When the voice communication is finished (YES in step S5) and the folding portable cellular phone set is closed, the body opening/closing state detection circuit 102 detects the "closed state" of the portable cellular phone set (YES in step S6) and sends out a signal indicating the closed state to the control CPU 101.

Upon reception of the signal indicating the closed state from the body opening/closing state detection circuit 102, the control CPU 101 controls the radio section 100 to finish the communication (S7).

If the "open state" is not detected in step S1 (NO in step S1), the control CPU 101 waits until the portable cellular phone set is opened. If it is determined in step S5 that the voice communication is not finished (NO in step S5), the control CPU 101 waits until the voice communication is finished. If it is determined in step S6 that the "closed state" is not detected (NO in step S6), the control CPU 101 waits until the closed state is detected.

The second embodiment of the present invention will be described next. The second embodiment relates to a flip type portable cellular phone set unlike the first embodiment, which relates to the folding portable cellular phone set.

Figure 3:
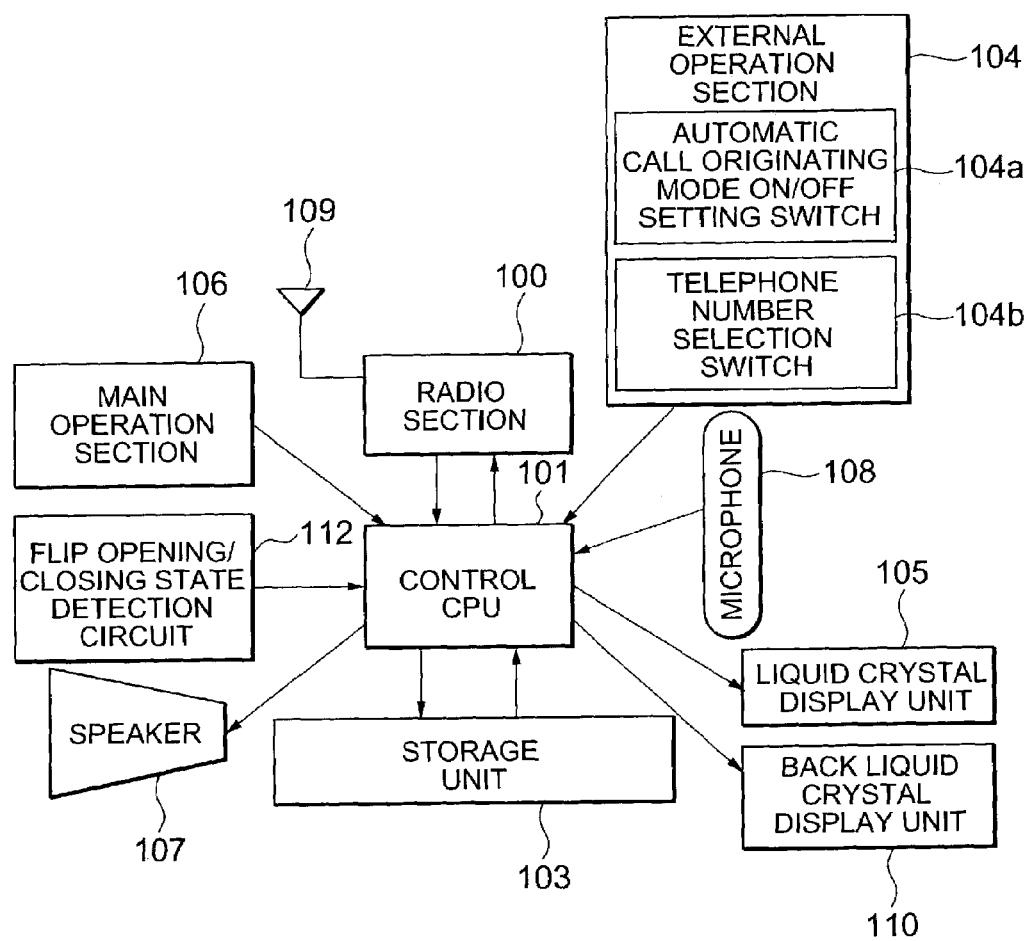
FIG. 3 is a block diagram showing the arrangement of a portable cellular phone set according to the second embodiment of the present invention.

As shown in FIG. 3, the flip type portable cellular phone set of the present invention includes a radio section 100, control CPU (Central Processing Unit) 101, flip opening/closing state detection circuit 112, storage unit 103, external operation section 104, liquid crystal display unit 105, main operation section 106, speaker 107, microphone 108, antenna 109, and back liquid crystal display unit 110.

That is, the second embodiment uses the flip opening/closing state detection circuit 112 in place of the body opening/closing state detection circuit 102 in the first embodiment. Since other constituent elements are the same as those in the first embodiment, a description thereof will be omitted.

The flip opening/closing state detection circuit 112 detects whether the flip of the portable cellular phone set is open or closed.

The operation of the second embodiment will be described next with reference to the flow chart of FIG. 2.

Before the description of the operation, assume that (1) at least one destination telephone number is stored in the storage unit 103, (2) the external operation section 104 has been operated to make ON setting for the mode of automatically originating a call when the closed flip is opened, and (3) a destination telephone number to which a call is to be automatically originated has been selected by operating the external operation section 104.

First of all, when the state of the flip of the portable cellular phone set is changed from the closed state to the open state, the flip opening/closing state detection circuit 112 detects the "open state" and sends out a signal to the control CPU 101 (YES in step S1).

Upon reception of the signal from the flip opening/closing state detection circuit 112, the control CPU 101 controls the radio section 100 to originate a call to the selected destination telephone number as an automatic call origination target (S2).

The radio section 100 then establishes a communicative state between the portable cellular phone set and a base station (not shown) through the antenna 109. This allows the operator to perform voice communication with the person having the selected telephone number by using the speaker 107 and microphone 108 (S3).

The operator then starts voice communication with a person having the selected telephone number (S4). When the voice communication is finished (YES in step S5) and the flip of the portable cellular phone set is closed, the flip opening/closing state detection circuit 112 detects the "closed state" of the portable cellular phone set (YES in step S6) and sends out a signal to the control CPU 101.

Upon reception of the signal from the flip opening/closing state detection circuit 112, the control CPU 101 controls the radio section 100 to finish the communication (S7).

If the "open state" is not detected in step S1 (NO in step S1), the control CPU 101 waits until the portable cellular phone set is opened. If it is determined in step S5 that the voice communication is not finished (NO in step S5), the control CPU 101 waits until the voice communication is finished. If it is determined in step S6 that the "closed state" is not detected (NO in step S6), the control CPU 101 waits until the closed state is detected.

What is claimed is:

1. A portable terminal equipment, comprising:
   storage means for storing one or a plurality of telephone numbers;
   telephone number selection means for selecting a predetermined telephone number from the telephone numbers stored in said storage means while said portable terminal equipment is closed;
   telephone number display means for displaying the telephone number selected by said telephone number selection means while said portable terminal equipment is closed;
   opening or closing detection means for detecting opening or closing of said portable terminal equipment; and
   control means for automatically originating a call to the telephone number selected by said telephone number selection means when an open state of said portable terminal equipment is detected by said opening or closing detection means,
   wherein said telephone number selection means comprises an automatic call originating mode On or Off setting switch for setting an automatic call originating mode while the portable terminal equipment is in a powered on state, and a telephone number selection switch; and said setting switch comprises an option that originates a call while said terminal is closed.

2. An equipment according to claim 1, wherein the automatic call originating mode On or Off setting switch further comprises a function of selecting whether to make said control means automatically originate a call while said portable terminal equipment is closed.

3. An equipment according to claim 2, wherein said portable terminal equipment comprises a folding type portable terminal equipment.

4. An equipment according to claim 2, wherein said portable terminal equipment comprises a flip type portable terminal equipment.

5. An equipment according to claim 1, wherein said portable terminal equipment comprises a folding type portable terminal equipment.

6. An equipment according to claim 1, wherein said portable terminal equipment comprises a flip type portable terminal equipment.

7. An equipment according to claim 1, wherein said control means originates a call to the telephone number selected by said telephone number selection means when the automatic call originating mode On or Off setting switch is in an on state and the opening or closing detection means detects the open state of said portable terminal equipment.

8. An equipment according to claim 1, wherein said control means does not originate a call to the telephone number selected by said telephone number selection means when the automatic call originating mode On or Off setting switch is in an off state and the opening or closing detection means detects the open state of said portable terminal equipment.

9. A communication method for a portable terminal equipment including storage means for storing one or a plurality of telephone numbers, telephone number selection means for selecting a predetermined telephone number from the telephone numbers stored in the storage means while the portable terminal equipment is closed, telephone number display means for displaying the telephone number selected by the telephone number selection means while the portable terminal equipment is closed, opening or closing detection means for detecting opening or closing of the portable terminal equipment, control means for automatically originating a call to the telephone number selected by the telephone number selection means when an open state of the portable terminal equipment is detected by the opening or closing detection means, and said telephone selection means comprises an automatic call originating mode On or Off setting switch for setting an automatic call originating mode, comprising:
   selecting in a non-communication status, by said switch, whether to allow said control means to automatically originate a call while said portable terminal equipment is closed and in a powered on state;
   detecting an open/closed state of the portable terminal equipment;
   establishing a communicative state when the open state is detected;
   performing voice communication with a person having a selected telephone number;
   detecting the closed state of the portable terminal equipment after the voice communication; and
   controlling communication termination when the closed state is detected.

10. A method according to claim 9, wherein the portable terminal equipment comprises a folding type portable terminal equipment.

11. A method according to claim 9, wherein the portable terminal equipment comprises a flip type portable terminal equipment.

12. A method according to claim 9, further comprising setting the portable terminal equipment to an automatic call originating mode by operating the telephone number selection means.

13. A portable communication device, comprising:
   a memory that stores at least one telephone number;
   a selection device disposed on an exterior surface of the portable communication device to select a telephone number from the memory when the portable communication device is in a closed state, the selection device comprising an automatic call originating mode On or Off setting switch for operation when the portable communication device is in a powered on state, and a telephone number selection switch;
   a display that is disposed on the exterior surface of the portable communication device and displays a telephone number selected by said selection device when portable communication device is in the closed state;
   a detector that detects whether the portable communication device is in an open state; and
   a controller that originates a call to the telephone number displayed on the display when the detector detects the open state of said portable terminal equipment; and said setting switch comprises an option that originates a call while said terminal is closed.

14. The portable communication device according to claim 13, wherein the automatic call originating mode On or Off setting switch comprises a selector switch that allows a user to select whether the controller originates a call to the telephone number displayed on the display when the detector detects the open state of said portable terminal equipment.

15. The portable communication device according to claim 13, wherein the selection device is mounted on a portion of the portable communication device accessible to a user when the portable communication device is in the closed state.

16. The portable communication device according to claim 13, wherein said controller originates a call to the telephone number displayed on the display
when the automatic call originating mode On or Off setting switch is in an on state and the detector detects the portable communication device is in the open state.

17. The portable communication device according to claim 13, wherein said controller does not originate a call to the telephone number displayed on the display when the automatic call originating mode On or Off setting switch is in an off state and the detector detects the portable communication device is in the open state.

* * * * *